United States Patent [19]

de Corlieu et al.

[11] 4,134,008
[45] Jan. 9, 1979

[54] LIGHT RETRO-REFLECTING RESPONSER AND DATA MODULATOR ARRANGEMENT

[75] Inventors: Guy de Corlieu; Marcel Malard; Jean-Claude Reymond; Léon Robin, all of Paris, France

[73] Assignee: Thomson-CSF, Paris, France

[21] Appl. No.: 867,246

[22] Filed: Jan. 6, 1978

[30] Foreign Application Priority Data

Jan. 25, 1977 [FR] France .................. 77 01990

[51] Int. Cl.² ........................... H04B 9/00
[52] U.S. Cl. ............................ 250/199; 343/18 D; 250/203 R; 356/152
[58] Field of Search .................. 250/199, 203 R; 343/18 D, 18 C; 356/141, 152; 350/150, 220

[56] References Cited

U.S. PATENT DOCUMENTS

| 3,308,464 | 3/1967 | Lewis | 343/18 D |
| 3,417,398 | 12/1968 | Lewis et al. | 343/18 D |
| 3,989,942 | 11/1976 | Waddoups | 250/199 |
| 4,066,335 | 1/1978 | Courtney | 350/220 |

Primary Examiner—Robert L. Richardson
Assistant Examiner—Edward L. Coles
Attorney, Agent, or Firm—Edwin E. Griegg

[57] ABSTRACT

A light retro-reflective responser and data modulator arrangement which, in particular, allows expected incident radiation to be reflected back with no contour field within the operating field and which enables an optical modulator of very small size to be used. It comprises a retro-reflective system formed by an optical objective and in the corresponding focal zone, a lens, an electronically controlled optical modulator, and a reflective mirror, the two latter items being produced as layers deposited on at least one face of the lens and preferably on the plane face of a plano-convex lens.

11 Claims, 21 Drawing Figures

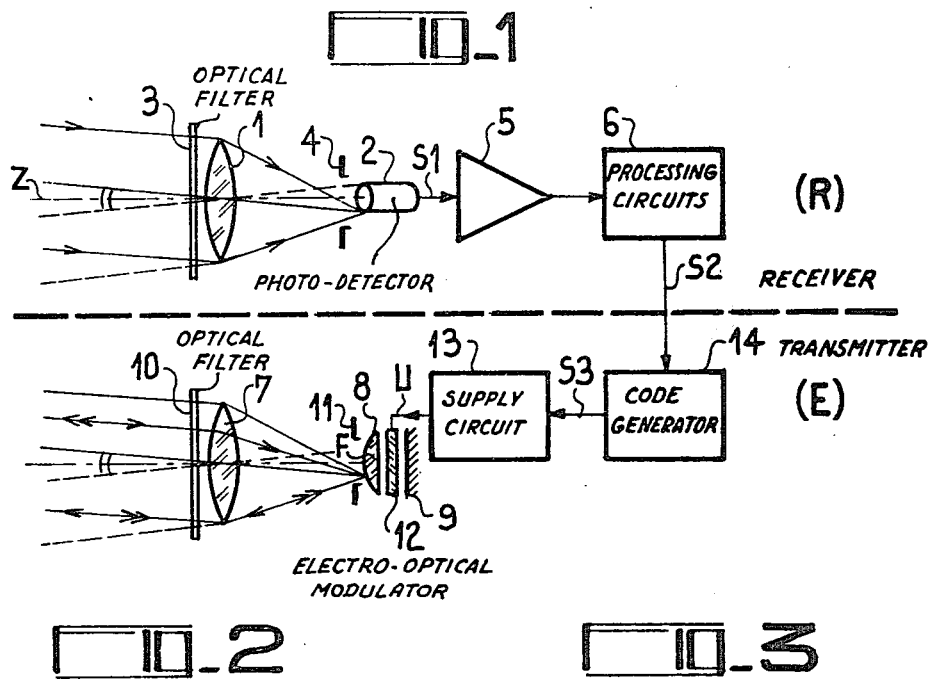
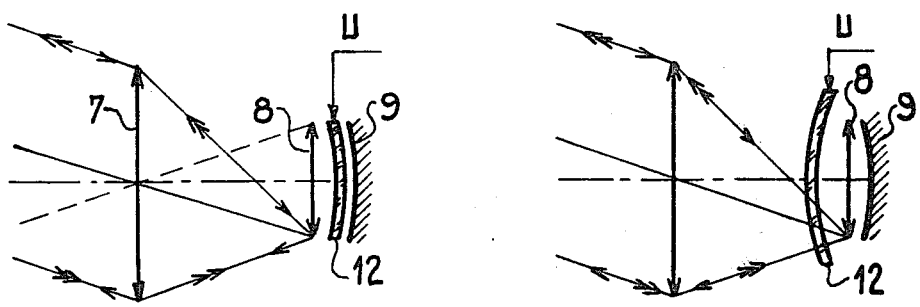
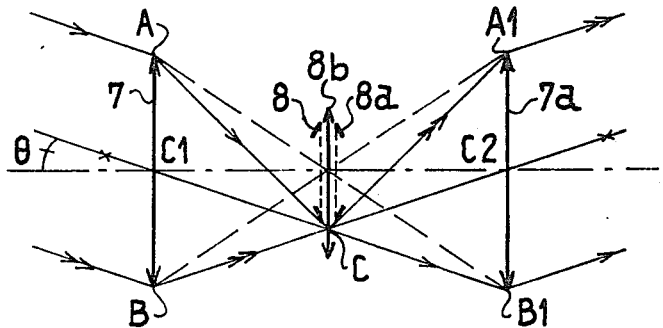

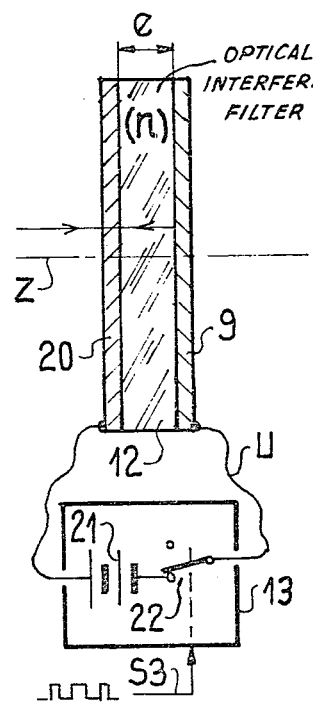
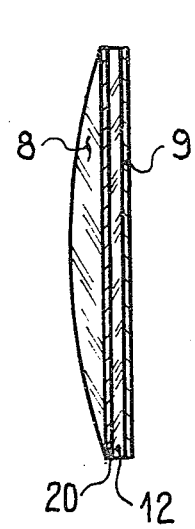
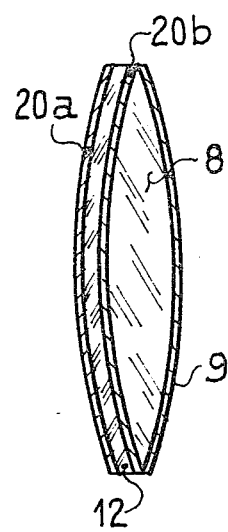
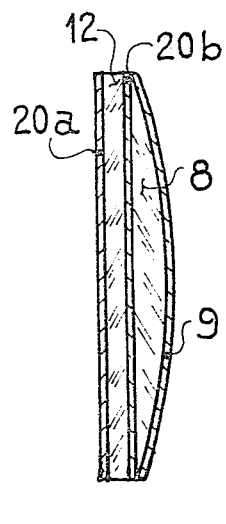
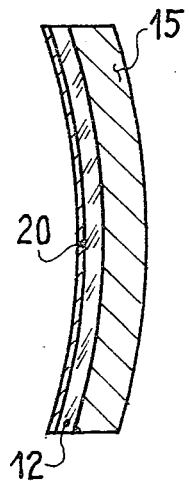
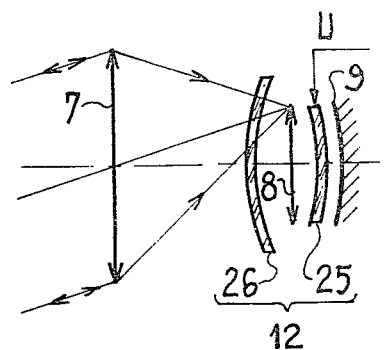

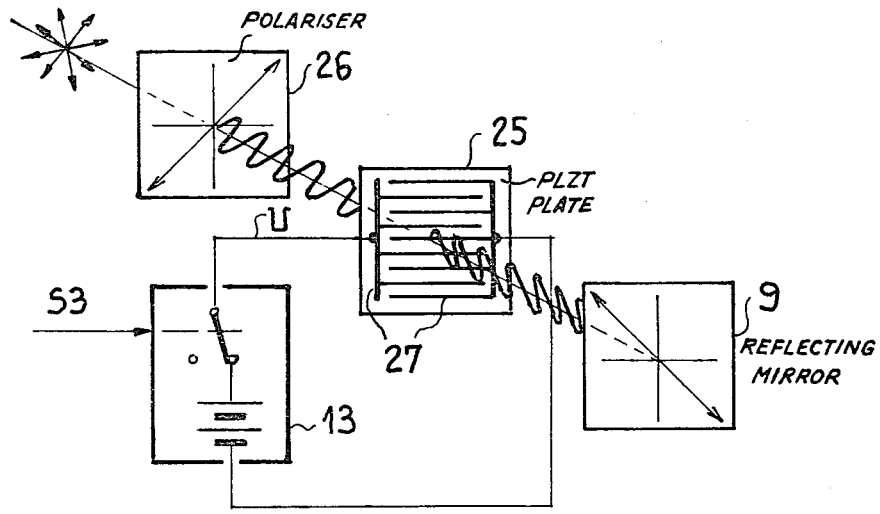
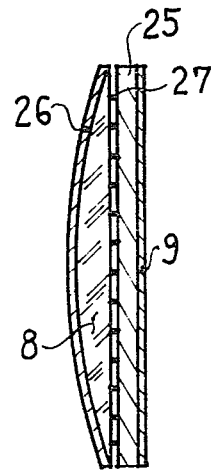 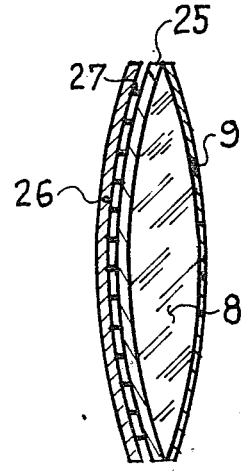

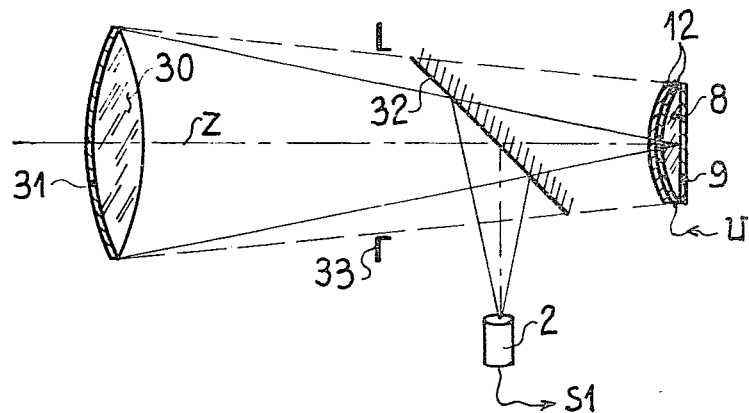
FIG_14
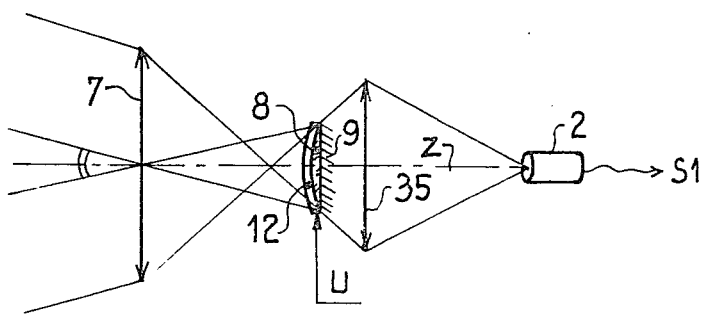
FIG_15
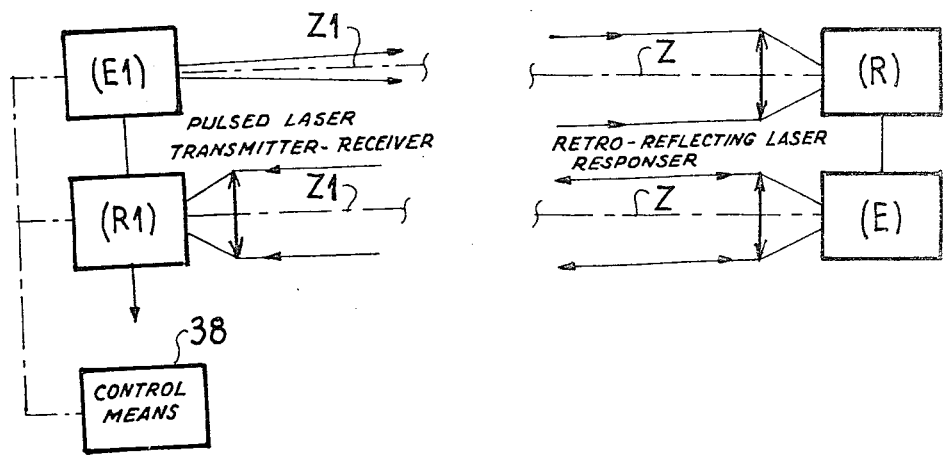
FIG_16

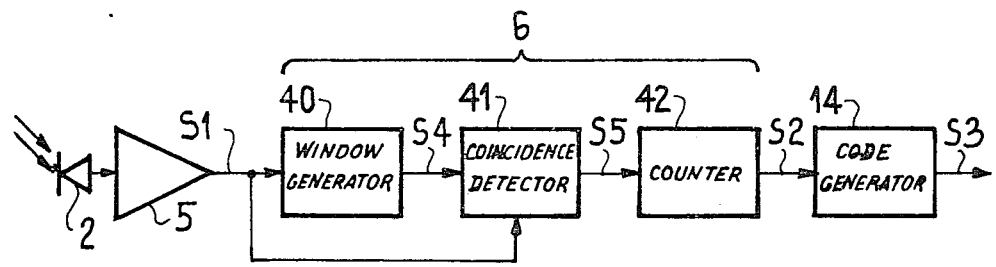
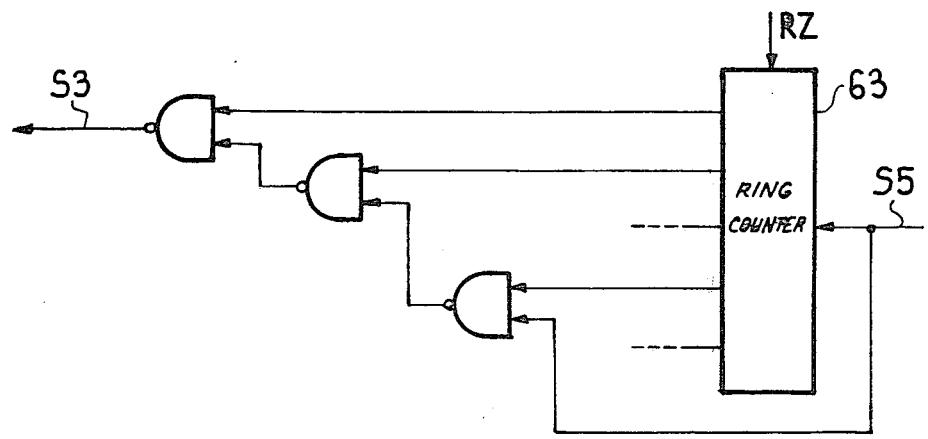
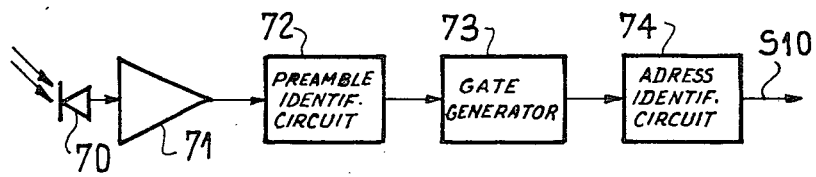

LIGHT RETRO-REFLECTING RESPONSER AND DATA MODULATOR ARRANGEMENT

The present invention relates to a light retro-reflecting responser and data modulator arrangement for providing electro-optical data links. The arrangement enables detection of an expected incident light radiation and transmission in response of a radiation produced by retro-reflection and data modulation of the incident radiation.

The arrangement apply, in particular, to produce IFF systems (Identification Friend or Foe). IFF systems are well known in the field of electromagnetic detection where they constitute an important application for radar beacons. Whether transmission takes place with electromagnetic waves or with light waves the principle of operation remains the same: an interrogating station transmits a predetermined signal towards a target or other station to be identified. When this target or station is friendly or allied, it is equipped with means to generate, when the interrogation signal is received, a response signal which is coded in a predetermined fashion and which is transmitted back towards the interrogating station. Depending upon whether or not such a coded signal is received, the interrogating station makes a friend or foe identification which may then serve as a basis for initiating further operations. In the military context a further operation may, for example, be the launching of a projectile at a hostile aerial target.

To exchange information by means of light radiation, the interrogating station emits a directional light beam which is preferably produced by a pulse laser. The pulse modulation enables operation with high peak power, thus giving the transmission an extended range.

A target to be identified is assumed first to have been acquired so that the transmitted radiation will illuminate it. When the target is friendly, it is equipped with photoelectric detecting means to detect the incident interrogating light beam and processing circuits for the corresponding identification. In the event of validation, a modulating circuit is triggered to modulate according to a code the light radiation which is transmitted in response to the interrogation. The target is so equipped as to transmit the response beam towards the interrogating station.

There is known to utilize a catadioptric device so that the incident interrogating radiation is retro-reflected and an electro-optical modulator which is inserted in the optical path close to the catadioptric reflector. The use of a reflective trirectangular trihedron or corner cube presents certain disadvantages: the area of field is at least that defined by the triangle forming the entry to the trihedron. This area is thus considerable and means that the dimensions of the optical modulator have to be of the same order. Not all the incident light energy is returned by reason of the fact that the full-light field of the reflector is restricted solely to the direction of the optical axis, whilst in any other direction a contour field appears. The accuracy of machining has to be high. The field cannot be adjusted by means of a diaphragm and this results in poor discretion.

The use of reflective material or paints, which is familiar in the field of identifying moving or other objects, is unsatisfactory particularly because it lacks the characteristics of discretion.

One object of the present invention is to produce an optical transponder arrangement which overcomes the above mentioned disadvantages. To do this, the catadioptric reflector which is employed is a catadioptric system whose entry/exit pupil is well defined, which allows fine adjustment for focussing and hence is undemanding in the matter of manufacturing tolerances, and which enables an optical modulator of small size to be used.

In accordance with a feature of the present invention, there is provided a light retro-reflecting responser and data modulator arrangement, intended in particular for producing a transponder in an Identification Friend or Foe system, comprising: reception means for the optical reception, photodetection and identification of expected incident light radiation, and transmission means for transmitting coded light radiation in response which employ a retro-reflective arrangement comprising, an optical objective for focussing the said incident radiation onto a mirror preceded by a lens and an opto-electrical modulator inserted in the optical path near the mirror, the said modulator comprising a plate which receives an electrical control, the said mirror and said modulator being as layers deposited on at least one face of the said lens, and a code generator for generating the said electrical control to provide the said reflected response radiation.

The invention will now be further described with reference to the accompanying drawings, which show:

FIG. 1, a simplified general diagram of a responser and modulator arrangement according to the invention, FIGS. 2 and 3, partial diagrams showing the catadioptric and optical modulator sections of the transmitter of the arrangement shown in FIG. 1, in the case of modified embodiments, FIG. 4, a diagram of the operation of the catadioptric system, FIG. 5, an embodiment of the optical modulator arrangement with a plate of the interference filter type which is tunable by electric control, FIGS. 6 to 9, detailed diagrams of various embodiments of the catadioptric system with a modulator plate as shown in FIG. 5, FIGS. 10 and 11, diagrams relating to a second embodiment of the optical modulator with a plate of the PLZT kind, FIGS. 12 and 13, detailed diagrams of different embodiments of the reflector with a modulating plate as shown in FIG. 10 or 11, FIGS. 14 and 15, partial diagrams showing modified embodiments of the transmitter/receiver arrangement of FIG. 1, FIG. 16, a general diagram of an optical IFF system incorporating a transponder arrangement as shown in FIG. 1, FIGS. 17 to 20, diagrams relating to an embodiment of transponder arrangement in the context of an application to an IFF system as shown in FIG. 16, and FIG. 21, a diagram of the receiver of the interrogator arrangement of an IFF system as shown in FIG. 16.

In FIG. 1, the reception section (R) of the arrangement is at the top and the transmitter section (E) at the bottom. The receiver (R) is provided with means for the optical reception and photodetection of expected light radiation. These means may consist, as shown, of an optical entry objective 1 which focuses incident radiation contained in the viewing field on the photosensitive surface of a detector 2. In addition, an optical filter 3 enables waves lying in the anticipated wavelength spectrum to be selected and a diaphragm 4 is provided to adjust the field. The detected signal S1 is amplified at 5 and applied to processing circuits 6. Where the incident radiation to be detected and identified comes from an interrogating transmitting station in the form of a modulated or coded laser beam, the processing circuits 6 are designed accordingly to identify the incident wave after filtering and detection. After identification, the receiver transmits a validating signal S2 to the transmitter E to cause a predetermined optical response to be transmitted in the same direction as that of the incident interrogating beam.

In accordance with the invention, the transmitter includes a catadioptric arrangement formed by a catadioptric optical system which consists of a focussing objective 7 at the entry to focus the incident radiation and, lying in or substantially in the corresponding focal image plane, a lens 8 followed by a mirror 9. In the diagram of FIG. 1, the lens is assumed to be of the plano-convex type, the front face, that is to say the face directed towards the entry, being convex and the rear face which precedes the mirror being plane. This form for the lens 8 is preferred because, in particular, it allows the mirror 9 to be plane. The radius of curvature of the lens is equal to f/n − 1, f being the focal distance of the objective 7 and n the refractive index of the lens 8. The lens 8 is positioned in such a way that its optical centre substantially coincides with the focus F of the objective 7 on axis which is parallel to the optical axis Z of the objectif 1. Exactly as in the case of reception, an optical filter 10 and a field adjusting diaphragm 11 are provided to filter the same wavelength spectrum and to obtain the same field as at reception. The optical modulator comprises a parallel faced optical plate 12 which is inserted in the optical path close to the focal zone and which is controlled electrically by a signal U, generally a voltage, produced by a supply circuit 13. The validating signal S2 is applied to a code generator 14 whose digital output S3 controls the supply circuit 13 to produce all or nothing operation.

FIGS. 2 and 3 show the reflector in a case where the lens 8 is of the biconvex type, the associated mirror 9 being convex likewise. The modulating plate 12 may be arranged upstream or downstream of the lens 8 and may follow the convexity of the associated face of the lens 8, like the mirror 9.

The operation of the reflective arrangement is illustrated in FIG. 4. The mirror 9 is replaced by lenses 8a and 7a which are respectively, identical to members 8 and 7 in order to allow the optical path to be opened out and the paths of the incident rays and the rays reflected by the mirror to be shown separately. The lenses 8a and 7a correspond to the images of lenses 8 and 7 in the mirror 9. If the thickness of the lens 8 along the optical axis Z and the distance separating members 8 and 9 are ignored, the optical interface 8–8a may be replaced by a lens 8b of the same diameter D and twice the convergence, i.e. having a focal distance f/2. A ray such as AC, for example, emerges from lens 8b and passes through the point B1 which is the conjugate point to A in lens 8b. Similarly, the ray BC is directed by lens 8b to the point A1 which is the conjugate point to B, while the ray C1C passes through the point C2 which is the conjugate point to C1; C1 and C2 being the optical centres of lenses 7 and 7a respectively. Thus, whatever the angle of incidence $\theta$ within the range in which the radiation is still situated within the field, that is to say for any value of $\theta$ less than or at most equal to the maximum value $\theta M$ given by tan $\theta M$ = D/2f, any incident ray emerges parallel to itself. There is no contour field. Under the approximation conditions which are assumed, all the received light radiation is returned parallel to itself when the angle $\theta$ is between zero and $\theta M$.

Another advantage results from the fact that the angular field of operation is adjustable, which enables the transmitter/receiver arrangement to be endowed with the requisite concentration. The transmission field is adjusted by a shutter 11 which is arranged close to the focal zone as shown in FIG. 1. The field may be made as small as desired. Depending upon whether the direction of the incident radiation is inside or outside the field, either all the light energy or no light energy is returned. Since the plate modulator device is situated close to the focal zone of the objective 7, it may thus be made small in size. Another advantage which results is that it becomes possible for production to be in the form of thin or shallow deposited layers.

For operation in a spectral band of longer wavelengths, in particular those above 3$\mu$, the modulator plate is advantageously formed by an electrically tunable optical interference filter as shown in FIG. 5. This interference filter or plate of the Perot-Fabry type is tunable by an applied voltage U which causes the optical thicknesse of the plate 12 to vary. If an incident ray is in phase opposition with the corresponding reflected ray, there is no transmission. The plate is said to be non-transmitting and operates at extinction. If on the other hand the phases are matched, there is transmission and the plate is said to be transmissive. Filters also exist which produce a change in the thickness e of the plate which causes a variation in its refractive index nl. The result is equivalent, the equation which the product nl.e has to satisfy being the same. To enable the control voltage U to be applied to the plate 12, the plate is coated on one or both of the faces transverse to the optical path with a transparent and conductive deposit 20 such as a deposit of silicon. On its other face a reflective metal deposit may be applied to form the mirror 9. The supply circuit 13 may consist of a DC source 21 and a switch device 22 operated by the digital signal S3.

FIGS. 6 to 9 show various embodiments of the optical combination 8, 9 with a modulating plate of the kind described above.

FIG. 6 shows a deposited plate with the mirror 9 on the plane side of a plano-convex lens 8 as shown in FIG. 1.

Figure 18:
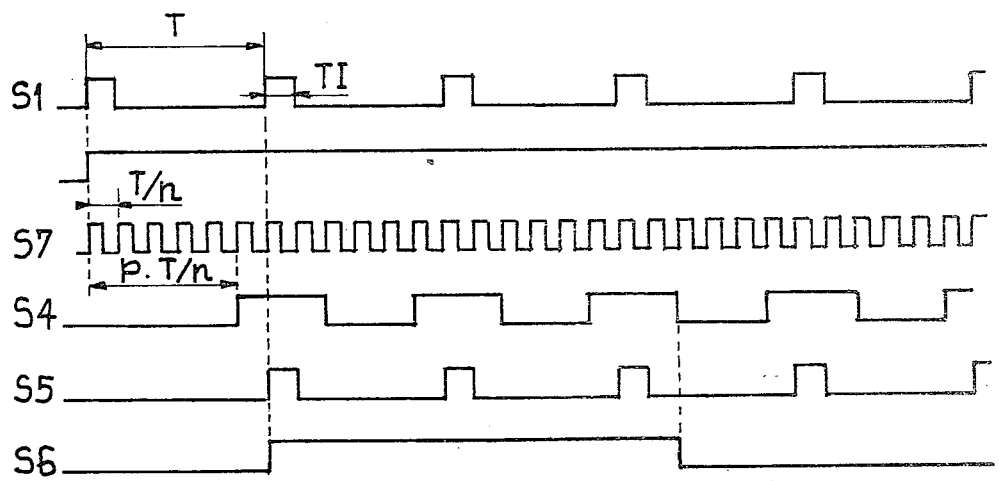

FIG. 7 shows an embodiment as illustrated by the diagram in FIG. 3. The plate 12 is deposited on the front face of the lens 8, which is biconvex, between transparent conductive deposits 20a and 20b, the mirror 9 being deposited on the rear face. FIG. 8 shows a similar structure with a plano-convex lens.

The preferred version is that shown in FIG. 6 since this enables all the deposits, namely that of the plate, the conductive connecting layer and the reflective mirror, to be made on a plane face which is formed by the rear face of the plano-convex lens 8.

FIG. 9 shows yet another possible embodiment in which the combination 8, 9 of FIG. 1 assumed to be replaced by a convex spherical mirror 15 of radius f. The plate 12, 20 is deposited on the mirror.

With a view to operation in shorter wavebands, in particular those situated below 3$\mu$, use is made of a modulator arrangement including a PLZT electro-optical shutter, which is indicated diagrammatically in FIG. 10 by a plate 25 and a polariser and analyser 26.

PLZT ceramics have properties of transparency and induced birefringence. When they are subjected to an electrical field, such ceramics cause the plane of polarisation of incident light to rotate through an angle which is a function of the locally applied electrical field. The electrical fields are obtained by applying a DC voltage of predetermined value to a circuit 27 which is deposited on the surface of the ceramic as shown in the diagram of FIG. 11. A PLZT plate is normally arranged between two polarisers which intersect at $\pi/2$, a first of these acting as a polariser for the incident light and the second acting as an analyser. Depending upon whether or not an electrical field is applied, the plane of polarisation of the light reaching the analyser does or does not allow the radiation to pass. Such an arrangement is described, inter alia, in the review "Applied Optics" vol. 14, number 8, August 1975, pages 1866-1873 in an article entitled "PLZT — Electrooptic Shutters: Applications" by: J. THOMAS CUTCHEN — JAMES O HARRIS JR. and GEORGE R. LAGUNA.

In the version which is employed in accordance with the invention, in view of the presence of the reflective mirror 9 the polariser 26 also acts as an analyser for the radiation reflected by the mirror. If it is assumed that the electrical field applied to the ceramic 25 causes the plane of polarisation of the light from the polariser 26 to rotate through a predetermined angle $\alpha$ whose value is in particular different from $\pi/2$ or a value close to $\pi/2$, then after reflection at the mirror, the polarised light is again rotated through $\alpha$ when it again passes through the plate 25. Reflection at the mirror 8 produces no rotation or rotation by an amount $\pi$. The angle of the radiation which returns to member 26 is thus $2\alpha$ or $2\alpha + \pi$ as compared with the original polarisation. Since this value is fairly different from $\pi$, the light does not pass through the analyser 26. If on the other hand there is no applied voltage U, at member 26 the reflected radiation is in the same plane of polarisation as on the inward journey and passes through the analyser. The result is, as in the case of a plate as shown in FIG. 5, that to obtain a system which is totally discrete in the absence of interrogating radiation, it is necessary to apply the control voltage U to the modulating plate.

FIGS. 12 and 13 show two embodiments in the cases of plano-convex and biconvex lenses 8 respectively. The various layers correspond respectively to the reflecting mirror 9, the deposited circuit 27, the PLZT plate 25 and the polariser and analyser 26.

FIGS. 14 and 15 relate to modified embodiments of the optical parts of the transmitter/receiver arrangement. In the embodiment of FIG. 14, a single entry objective 30 is used for the transmitter and the receiver. Optical filtering may be achieved by depositing selective reflecting layers 31. A semi-transparent mirror 32 which is inclined at 45° to the optical axis Z allows two channels to be produced, namely the reception channel to the photodetector 2, which is situated at the appropriate focus, and the transmission channel to the combination 8, 9, 12. A single diaphragm 33 enables the same field aperture to be set for both transmission and reception. The mirror 32 is calculated to direct a very small proportion of the incident light energy, one to a few percent for example, to the photodetector 2.

In the embodiment of FIG. 15, the mirror 9 is semi-reflective so that it allows a small proportion of the incident light to pass to the photodetector 2, whic is arranged downstream of and to the rear of the mirror. An additional objective 35 is provided between the mirror and the photodetector to collect the transmitted light flux and focus it onto the photodetection surface.

FIG. 16 is a general diagram of an application to an Identification Friend or Foe or IFF system. The interrogator, on the left of the Figure, comprises an pulsed laser transmitter (E1) which produces a directive light beam. A receiver (R1) is associated with the transmitter (E1) in such a way that the axis of the beam lies in the same direction Z1 as the axis of the reception field. Ancillary means 38 control the position of the combination (E1, R1) to allow the beam to be shifted during a search phase and then to be trained on a target to be identified during the acquisition phase.

The section shown on thr right is the optical transponder fitted to a friendly target, which is formed by at least one combination (E, R) as shown in FIG. 1. In practice, to cover a sufficiently wide field, the reception means (R) will need to be duplicated to form a plurality of channels so that together the individual fields cover the desired overall field. The same applies to the transmission means (E) unless there is at reception some channel identifying means which is used to servo-control the orientation of a single transmitter according to the direction Z of the channel which carries the strongest detected signal.

FIG. 17 is a diagram of the transponder and FIG. 18 shows operating waveforms. The transponder is arranged to identify the repetition rate of the laser transmission and to return the incident beam in the same direction whilst modulating it on the all or nothing principle. The receiver (R1) in turn identifies the friendly target by the coding which is performed on the response beam. The signal S1 which is detected at 2 and amplified at 5 is identified in circuits 40 to 42. The first laser pulse which is received triggers a window generating circuit 40, the window signals S4 being produced at the pulse rate T of the laser and their length and position being determined in relation to the received coding, that is to say the laser pulses. A coincidence detecting circuit 41 emits a pulse S5 whenever a pulse S1 lies in a gate S4. A counting circuit 42 enables reception to be validated when the count reaches a predetermined number in a given time interval, for example three pulses S5 in the course of one period (S6 FIG. 19) of duration comprised between 3T and 4T. In practice, the count will be performed periodically and on a larger number of pulses with an upper and lower tolerance allowed, which amounts to setting a validity range for the count. The output S2 of the counter controls transmission. The optical modulation is stopped if the count is outside the validity range and the validating signal S2 is then no longer emitted.

Figure 19:
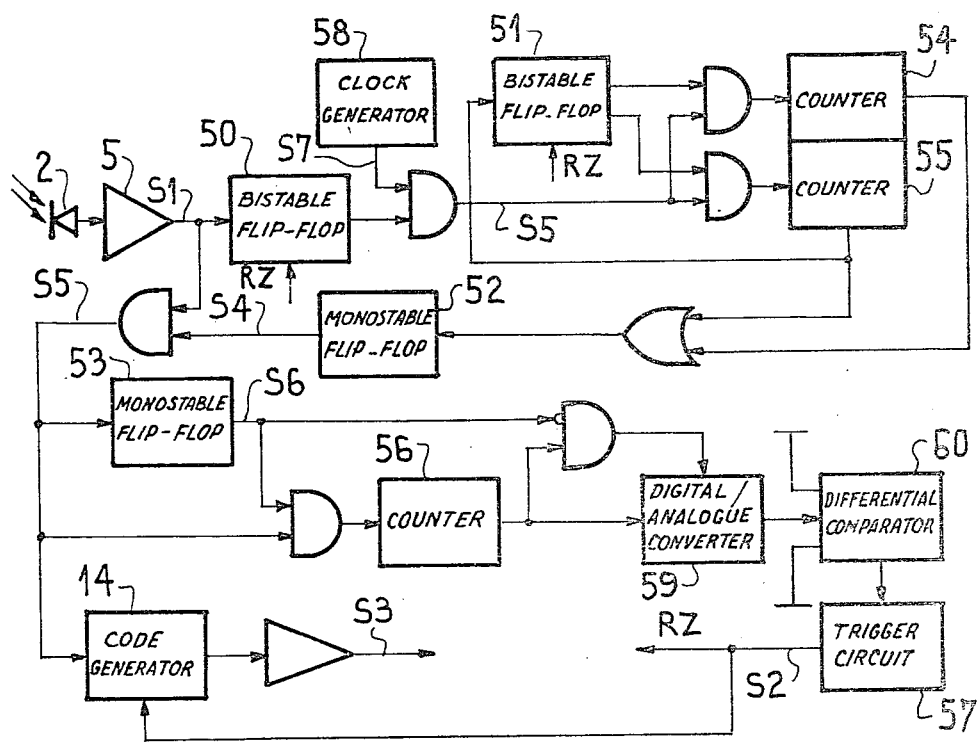

As shown in FIG. 19, the circuits 40 to 42 may easily be produced by using logic gate circuits, bistable flip-flops 50, 51, and monostable flip-flops 52, 53, counters 54, 55, 56, and a trigger circuit 57. A local clock 58 produces a signal S7 of period T/n. A count of p clock pulses (p<n) initiates the formation of the first gate signal S4, whose period is T and whose length is greater than that T1 of the laser pulse. The counting interval S6 may be set by a monostable circuit 53. The counting circuit 56 may be followed by a digital/analogue converter 59 in series with a differential comparator circuit 60 define the margin of tolerance on measurements.

As shown in FIG. 20, the modulation generator 14 may for example consist of a ring counter 63 which is triggered by the zero reset signal S2 (RZ) and which receives the coincidence signal S5 so as to produce a signal which corresponds to the transmitted code S1 deprived of a certain number of pulses whose positions correspond to the unused parallel outputs of the counter. In the example shown and considering a time equivalent to five periods T, the signal S3 corresponds to the signal S1 deprived of its third and fifth pulses.

In the diagram of FIG. 21, the receiver (R1) of the interrogator contains, after photodetection at 70 and amplification at 71, a preamble identifying circuit 72, a gate generating circuit 73 and an address identifying circuit 74. Operation is as follows: each message is formed by a train of pulses at the laser repetition rate, a number of which pulses may be absent due to the coding performed by the friendly target. The message contains a preamble which precedes the address forming the message proper. The preamble may consist of a few pulses to synchronise the address decoding at 74. The gates which are generated at 73 are centred on the pulses to be received to avoid the possibility of picking up interference pulses which do not belong to the message. The identification signal S10 is intended for further use.

Both the receiver (R1) and the ancillary acquisition circuits 38 (FIG. 16) are assumed to be produced using known techniques and are not described in detail since they form no part of the subject of the invention and may take many forms.

It is understood that the above description of the arrangement and of its application to an IFF system which is particularly envisaged are not to be considered limiting. The arrangement may equally well be applied, for example, to the transmission of data where only a single transmitter is required for the whole of the transmitting system.

What is claimed is:

1. A light retro-reflecting responser and data modulator arrangement intended in particular for producing a transponder in an Identification Friend or Foe system, comprising: reception means for the optical reception, photo-detection and identification of expected incident light radiation, and transmission means for transmitting coded light radiation in response which employ a retro-reflective arrangement comprising an optical objective for focussing the said incident radiation onto a mirror preceded by a lens and an opto-electrical modulator inserted in the optical path near the mirror, the said modulator comprising a plate which receives an electrical control, the said mirror and said modulator being as layers deposited on at least one face of the said lens, and a code generator for generating the said electrical control to provide the said reflected response radiation.

2. An arrangement according to claim 1, wherein the lens is plano-convex and the deposits are preferably made on the plane face in the form of successive layers to produce the modulating plate and the mirror in succession.

3. An arrangement according to claim 1, wherein the optical modulator is of the tunable optical interference filter kind, comprising a parallel-faced plate transverse to the optical path with a layer of conductive material on either face to allow the said electrical control to be connected and applied, the lateral deposit on the face of the filter plate which is to the rear in the direction of the incident optical path forming the said mirror.

4. An arrangement according to claim 1 includes means for adjusting the aperture of the transmission field in the form of a shutter device positioned downstream of the optical objective.

5. An arrangement according to claim 1, wherein the said mirror is semi-reflective to reflect a fraction of the incident radiation onto a photodetector device at the input of the said receiver, the said semi-reflective mirror being arranged between the said optical objective and the combination formed by the lens the plate modulator and the mirror.

6. An arrangement according to claim 1, wherein the said mirror is semi-reflective to allow a predetermined fraction of the incident light radiation to pass, which radiation is focussed downstream onto a photodetector device at the input of the said receiver.

7. An arrangement according to claim 1 in which means are provided for inhibition when the said expected incident radiation is not received and identified, the said inhibiting means being formed on the transmission side, the said transmission means comprising a DC source switched by a switching circuit controlled by a digital signal to provide the said electrical control in the form of a DC voltage which is applied continuously in the absence of the said incident radiation to render the retro-reflecting arrangement passive and to ensure total discretion and which is applied discontinuously in accordance with the coding of the said digital signal when the said incident radiation is identified.

8. An Identification Friend or Foe system which comprises an arrangement according to claim 1 to form a transponder installed on board a friendly target, and a remotely situated transmitter/receiver combination forming an interrogating station, the transmitter of the interrogating station being a pulsed laser, wherein the transponder arrangement produces a digital modulation by suppressing certain pulses of the transmission code in the course of a predetermined interval.

9. An arrangement according to claim 1, wherein the optical modulator comprises an optoelectrical PLZT shutter formed by a first plate of PLZT ceramic with a deposited circuit for the said electrical control to be connected and applied, which plate is arranged between a second polarising and analysing plate and the said mirror.

10. An arrangement according to claim 9 wherein the lens is plano-convex, the polarising and analysing plate is deposited on the convex face of the lens, the deposited control circuit, the PLZT plate, and the mirror being deposited in succession on the plane face of the lens.

11. A light retro-reflecting responser and data modulator arrangement intended in particular for producing a transponder in an Identification Friend or Foe system, comprising: reception means for the optical reception, detection and indentification of expected incident light radiation, and transmission means for transmitting coded light radiation in response which employ a retro-reflecting arrangement comprising an optical objective focussing the said incident radiation onto a convex spherical mirror and an optoelectrical modulator inserted in the optical path near the mirror, the said modulator comprising a plate which receives an electrical control and being produced as layers deposited on the said convex spherical mirror, and a code generator for generating the said electrical control to provide the said reflected response radiation.

* * * * *